US012693034B2

(12) United States Patent
Drexler et al.

(10) Patent No.: US 12,693,034 B2
(45) Date of Patent: Jul. 28, 2026

(54) CEILING-MOUNTED RADIATING ELEMENTS

(71) Applicant: Kermi GmbH, Plattling (DE)

(72) Inventors: Georg Drexler, Rimbach (DE);
Veronika Gerbrich, Deggendorf (DE);
Roland Hofinger, Deggendorf (DE);
Johannes Reichert, Plattling (DE);
Günter Schmalhofer, Deggendorf (DE)

(73) Assignee: Kermi GmbH, Plattling (DE)

( * ) Notice: Subject to any disclaimer, the term of this patent is extended or adjusted under 35 U.S.C. 154(b) by 943 days.

(21) Appl. No.: 17/919,182

(22) PCT Filed: Apr. 12, 2021

(86) PCT No.: PCT/EP2021/059435
§ 371 (c)(1),
(2) Date: Oct. 14, 2022

(87) PCT Pub. No.: WO2021/209385
PCT Pub. Date: Oct. 21, 2021

(65) Prior Publication Data

US 2025/0341323 A1    Nov. 6, 2025

(30) Foreign Application Priority Data

Apr. 15, 2020    (DE) ......................... 102020204727.8

(51) Int. Cl.
*F24F 5/00* (2006.01)
*F16L 21/08* (2006.01)
*F24D 19/00* (2006.01)

(52) U.S. Cl.
CPC ............ *F24F 5/0003* (2013.01); *F16L 21/08* (2013.01); *F24D 19/0017* (2013.01);
(Continued)

(58) Field of Classification Search
CPC ........ F16L 21/08; F24D 19/0017; F24D 3/12;
F24D 3/16; F24D 3/165; F24F 5/0092;
F24F 2221/02; F24F 2221/14
(Continued)

(56) References Cited

U.S. PATENT DOCUMENTS 4,759,402 A * 7/1988 Osojnak .................. F24D 3/165
165/56
5,950,720 A * 9/1999 Klix ...................... F24F 5/0092
237/70
(Continued)

FOREIGN PATENT DOCUMENTS

CA      2081816 A1    5/1993
DE      2353628 A1    4/1975
(Continued)

*Primary Examiner* — Steve S Tanenbaum
(74) *Attorney, Agent, or Firm* — Bonini IP Law, LLC;
Frank J. Bonini, Jr.

(57) ABSTRACT

Ceiling-mounted radiating elements for heating or cooling rooms, comprising means for connecting the ceiling-mounted radiating elements together, wherein the ceiling-mounted radiating elements comprise at least one through-flow pipe for a heating or cooling medium, and radiating surfaces are arranged radially around said pipe, wherein to connect two ceiling-mounted radiating elements (1, 1'), at least one core piece (2) is provided which allows an operationally tight connection of the through-flow pipes (3) of two ceiling-mounted radiating elements (1, 1') to be connected, and at least one mounting rail (4) for positioning at least one connecting part (5) is provided, which locks and secures the ceiling-mounted radiating elements (1, 1') when a connection is produced.

20 Claims, 5 Drawing Sheets

(52) U.S. Cl.
CPC ........ *F24F 5/0092* (2013.01); *F24D 2220/06*
(2013.01); *F24F 2221/02* (2013.01); *F24F*
*2221/14* (2013.01); *F24F 2221/36* (2013.01);
*F24F 2221/54* (2013.01)

(58) Field of Classification Search
USPC .......................................................... 165/179
See application file for complete search history.

(56)                    References Cited

U.S. PATENT DOCUMENTS

2013/0168040 A1*   7/2013  Guckert ................ F24F 5/0089
                                                                            165/53
2015/0338112 A1*  11/2015  Parikh .................. F24F 5/0089
                                                                            165/56

FOREIGN PATENT DOCUMENTS

| | | | |
|---|---|---|---|
| DE | 3919515 | A1 | 12/1990 |
| DE | 9102260 | U1 | 5/1991 |
| DE | 19617718 | A1 | 10/1997 |
| DE | 102004002726 | B3 | 6/2005 |
| DE | 102008020422 | A1 | 10/2009 |
| DE | 102011053206 | A1 | 3/2013 |
| DE | 102014226713 | A1 | 6/2016 |
| EA | 33039 | B1 | 8/2019 |
| EP | 0555494 | A1 | 8/1993 |
| EP | 2781842 | A2 | 9/2014 |
| ES | 2386053 | A1 | 8/2012 |
| GB | 1345941 | A | 2/1974 |
| GB | 2262548 | A | 6/1993 |
| RU | 160965 | U1 | 4/2016 |
| WO | 9113294 | A1 | 9/1991 |
| WO | 2008030167 | A1 | 3/2008 |
| WO | 2013030356 | A2 | 3/2013 |

* cited by examiner

CEILING-MOUNTED RADIATING ELEMENTS

BACKGROUND OF THE INVENTION

1. Field of the Invention

The invention relates to ceiling-mounted radiating elements with means for connecting the profiles together and to the pipe network.

2. Brief Description of the Related Art

Ceiling-mounted radiating elements serve for heating or cooling rooms, and to this end, heating or cooling medium flows through the elements. Such elements or profiles are known and are usually extrusions. They have a through-flow pipe for the heating or cooling medium and radiating surfaces arranged thereon. The radiating profiles are usually provided with fixing strips or rails for brackets, wherein the ceiling-mounted radiating profile is usually attached to the bracket by a fixing rail. For example, GB 2 262 548 A describes a ceiling-mounted radiator of the above-mentioned type in which a through-flow pipe containing the stream of heating or cooling medium is shielded by a radiating surface.

DE 196 17 718 A1 discloses a ceiling-mounted radiator of the described type which comprises a through-flow pipe with several radiating surfaces with fixing strips. According to WO 91 13294, a through-flow pipe is also integrated in structural elements which have widely varying configurations for radiating. The manner in which the profiles are connected to a ceiling-mounted radiator consisting of several profiles is not described in said prior art.

DE 10 2004 002 726 B3 discloses a heating and/or cooling ceiling consisting of modules which can be suspended from the building. Various hose connection pieces for hose pieces are provided on the pipes, for creating a connection between the modules.

U.S. Pat. No. 4,759,402 A describes individual elongate heat radiation plate modules which are connected together along their side edges in order to form a panel, with a plurality of reinforcements which run transversely with mutual spacing and are connected to a plurality of connection points on the back side of the panel in order to stiffen and secure the panel.

EP 2 781 842 A2 describes a wall or ceiling cladding with a cooling and/or heating system, wherein the wall or ceiling cladding can be fastened to at least one bracket profile on the wall or ceiling of a structure, wherein on a room side facing the room to be cooled or heated, the bracket profile has a first receiving means for a pipe or pipeline matrix of the cooling and/or heating system, the receiving opening of which faces the room. On each of two mutually opposite side faces which extend parallel to the first receiving means, the bracket profile has a concave bead-like design so that a second receiving means for the pipeline matrix of the cooling or heating system is formed between two adjacent bracket means, the receiving opening of which faces the room. Furthermore, the pipeline matrix may have at least one straight portion which is fixedly connected to the receiving means in the bracket profile so as to form an integral component; in particular, the straight portion of the pipeline matrix and the bracket profile form a common profile which can be produced in a single production process, for example an extrusion process, wherein the straight portion is preferably configured as a pipe.

At present, the ceiling-mounted radiating profiles—usually consisting of an aluminum alloy—are connected by means of screw-in coupling and connecting elements. These are conventional press fittings made of galvanized steel or stainless steel.

The connection method is well established in the trade but offers potential for improvement in the areas of:
corrosion resistance,
appearance, and
installation time (e.g. in large buildings).

For this, a thread must be made in the profile in the factory. The surface layer to be protected in the connecting region is removed here, so that unprotected material and material of the connection components can come into contact with the medium at one point, which can lead to corrosion.

When galvanized fittings are used, the present standard VDI2035 allows a very narrow tolerance range for the water composition. The stainless steel design, which allows a wider tolerance range of the medium, has a significantly higher sale price.

For installation, also suitable pressing tools are required with manufacturer-specific pressing geometry.

Furthermore, the distance between two connected profiles gives an appearance of industrial character, which is not desired in buildings with high design standards. For this reason also, module lengths of up to 12 m are preferred.

A further disadvantage is that the connection with press fittings cannot be separated or profiles removed without destruction.

SUMMARY OF THE INVENTION

The object of the invention is therefore to improve the connection techniques known from the prior art for ceiling-mounted radiating profiles. According to the invention, this object is achieved by the features of claim 1.

The invention accordingly comprises a ceiling-mounted radiating element, in particular a ceiling-mounted radiating profile, for heating or cooling rooms, comprising means for connecting the ceiling-mounted radiating elements together, wherein the ceiling-mounted radiating elements comprise at least one through-flow pipe for a heating or cooling medium. According to the invention, it is provided that at least one core piece is provided which allows an operationally tight connection of the through-flow pipes of two ceiling-mounted radiating elements to be connected, and at least one connecting part and at least one mounting rail for positioning the at least one connecting part are provided, which lock and secure the ceiling-mounted radiating elements when a connection is produced.

According to a further feature of the invention, it is provided that the core piece has ring and/or collar and/or stop-centering elements arranged in the middle, and at least one seal is arranged on both sides at a defined distance. This guarantees adequate tightness. According to another feature, it is provided that the mounting rails and the at least one connecting part have mechanisms in active co-operation. These guarantee security against slippage and twisting of the ceiling-mounted radiating elements. Advantageously, it is furthermore provided that the at least one mounting rail can be used as a connecting element for a ceiling fixing and/or for mounting of additional attachments. According to a further feature, it is possible for two ceiling-mounted radiating elements to be connected together via a corner transition piece, wherein the corner transition piece has at least one seal on both sides at a defined distance. This guarantees adequate tightness. Pipe clamps are provided on both sides of the corner transition piece, at which connecting parts are arranged which are suitable for guiding in the mounting rails of the ceiling-mounted radiating elements to be connected at a corner.

It is furthermore advantageously provided that the ceiling-mounted radiating elements comprise at least one through-flow pipe for a heating or cooling medium, and several radiating surfaces are arranged radially around said through-flow pipe, wherein the arrangement of the radiating surfaces around the through-flow pipe is possible in all conceivable variants, wherein at least two radiating surfaces are positioned symmetrically or asymmetrically around the through-flow pipe.

It is possible here that the mounting rails for positioning of at least one connecting part are arranged directly radially offset around the circumference of the through-flow pipe. Alternatively, it is particularly advantageously possible that the mounting rails for positioning of at least one connecting part are arranged at the free ends of the radiating surfaces.

The ceiling-mounted radiating elements can advantageously be fluidically connected in series one behind the other and/or around corners or in parallel (cascade) via a collector.

With the ceiling-mounted radiating element with connecting system according to the invention, the disadvantages described above may be overcome. The features of the ceiling-mounted radiating element with connecting system allow connection of the elements with a defined intermediate gap or with no intermediate gap.

BRIEF DESCRIPTION OF THE DRAWING FIGURES

The invention is described in more detail below with reference to exemplary embodiments. In the drawings.

DETAILED DESCRIPTION OF THE INVENTION

Figure 1:
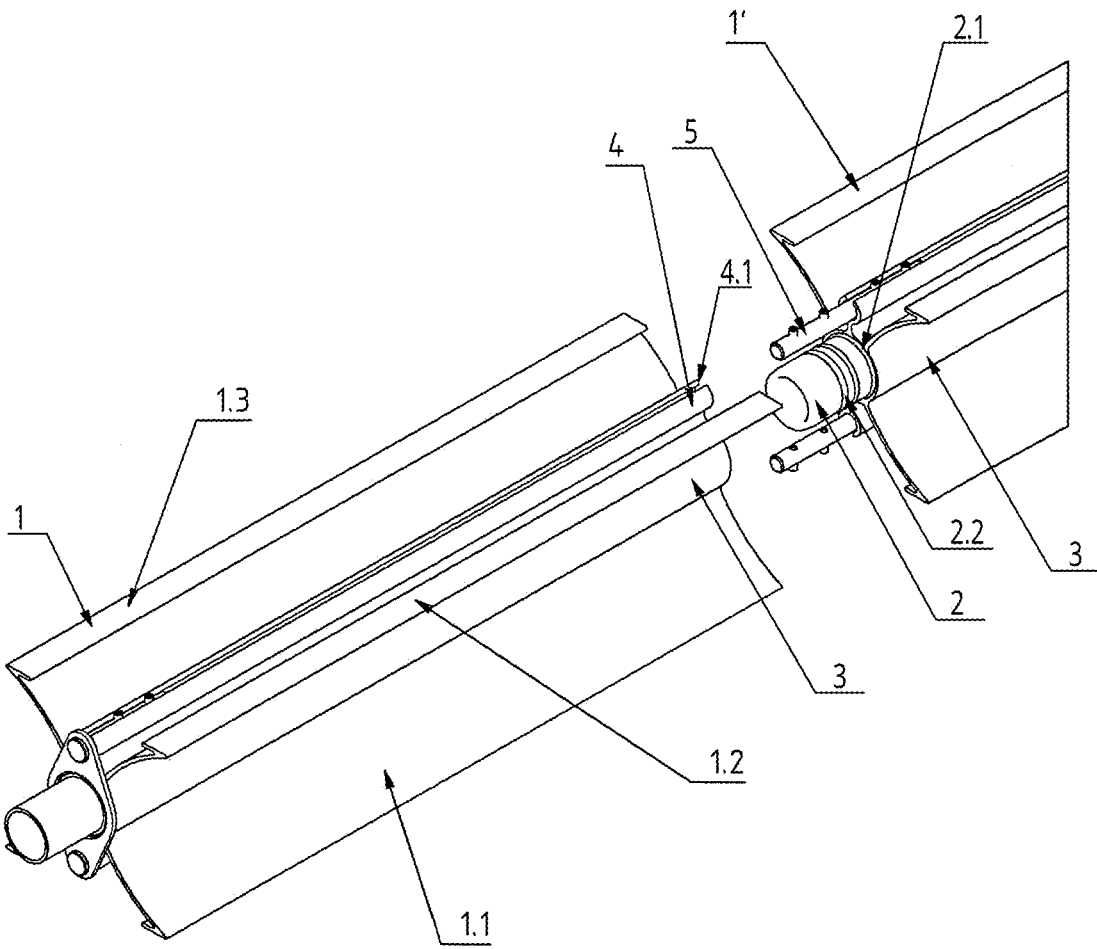
FIG. 1 shows a perspective view of two ceiling-mounted radiating elements to be connected together.

The ceiling-mounted radiating element with connecting system, depending on installation type, comprises the following components:

1. Ceiling-mounted radiating element modules
2. Core piece with seals
   sealing function
   hydraulic interface
   spacing
   The spacing may be achieved either via the connecting parts or via the core piece. Various additional elements such as a retaining ring, O-ring, molding integrated in the structure, etc. may be added to the core piece or connecting part.

3. Connecting part for ceiling-mounted radiating element
   mechanical interface
   absorption of forces
   spacing
   interface to ceiling connection
   control function
   The control function is implemented by control elements and/or components which are integrated directly on and/or in the connecting parts. These elements and/or components must be clearly visible to the installing engineer during the mounting process. This ensures that the fixing components are tightened and the connection is secure. A force fit is created between the mounting rail and connecting part. In the head region of the setscrew, a paint marking is made which disappears when the setscrew is screwed into the connecting part. This ensures a technical and/or visual control of the form fit and force fit.
4. Adapter for supply and/or return with connectors and/or external threads for connection to the pipe network
5. Special components and covering accessories, e.g. for technical connection components.

The individual components are described in detail below.
1. The ceiling-mounted radiating element module has a performance-optimized and protected profile geometry. A chamfer and/or jointing slope with a defined angle is made in the profiles in order to guarantee simple and damage-free mounting of the core piece. The connecting region must be free from burrs and foreign bodies and/or damage. Suitable tools and devices are necessary for the chamfer. There is no longer a need for a thread in the connecting region, as in the previous solutions.
   Mounting rails are provided on the top and bottom of the water-conducting pipe, which are structurally integrated into the ceiling-mounted radiating elements and may be used for fixing the ceiling-mounted radiating elements to the ceiling and for mounting components (lamps etc.) underneath. In addition, the rails serve to connect two ceiling-mounted radiating elements together by means of connecting parts.
2. The core piece creates the operationally tight connection between two ceiling-mounted radiating elements. The ring and/or collar and/or stop-centering element arranged in the middle allows a rapid centralized installation. At least one seal is arranged at a defined distance on both sides, which guarantees adequate tightness. The function is divided into mechanical connection and seal. This division allows the use of simple and economic components.
   Mounting:
   Mounting requires no tools and no additional sealing material (hemp, sealing tape, liquid sealant etc.). Normal hand force is sufficient. The great ease of mounting also allows installation at locations with difficult access and under difficult mounting conditions. Non-destructive removal is possible.
   Hydraulics:
   The core piece has an optimized flow geometry which exerts less influence on the hydraulics of the installation than conventional systems (very low pressure loss and turbulence).
   Corrosion:
   The core piece consists of permanently corrosion-resistant material (stainless steel, polyamide, aluminum etc.).

Because of the optimized flow geometry and design, areas with water build-up and hence corrosion formation are avoided.

3. The connecting part may fulfil several functions as follows:

a) holding the ceiling-mounted radiating elements together against slipping apart, b) stable guidance and alignment when joining ceiling-mounted radiating elements, c) security against twisting of the ceiling-mounted radiating elements, d) (in some cases) as a connecting element for ceiling fixing or additional attachments.

This fixing component is positioned in the mounting rail of the ceiling-mounted radiating elements. It is secured against displacement in the mounting rail by form fit and force fit (e.g. setscrew etc.). Alternatively, the connecting part may be secured via a snap-fit or push-fit mechanism.

The fixing method allows simple and non-destructive dismantling of the connection between modules.

After installation, the safety check must be performed by integrated control elements (e.g. sealing paint on setscrew, adhesive tape etc.), to ensure that the form fit and force fit are secure.

4. The adapter for supply and return forms the interface of the ceiling-mounted radiating element sections to the system components such as conduction pipes, shut-off valves, volume flow control valves etc.

The interface may be produced e.g. with a connecting thread (internal and/or external), pressing geometry or pipe piece.

Designed unilaterally, like the core piece.

The adapter may also be equipped with elements which allow simultaneous connection of the profile (e.g. insert pipe or lance valve).

Fixing to the ceiling-mounted radiating element takes place via the above-described connecting piece.

Because of the optimized flow geometry and design, areas with water build-up and hence corrosion formation are avoided.

5. For particular installation situations, special components or particular covering parts are required.

a) corner connection: two ceiling-mounted radiating elements are connected together with a corner transition piece (various angles) and secured against displacement.

b) connection of several elements/collectors using cascading components. Cascading may achieve a higher performance than a single ceiling-mounted radiating element. By mounting several ceiling-mounted radiating elements closely in parallel with one another, a multiple of the performance is achieved. The mounting time is reduced since there is no need to suspend many individual profile sections, but merely a few in assembled blocks (cascade).

System Advantages:

easier mounting at great height (previously requiring special pressing tools), visual alignment not required/automatic, no special tools required, easier on-site handling because of smaller modular elements (previously, max. 12 m), non-destructive dismantling (previously, press fitting destroyed on dismantling),

spacing between ceiling-mounted radiating elements jointless (0 cm) or with defined joint (previously, spacing at least 7 cm, depending on press fittings).

No additional sealing materials required.

FIG. 1 shows two ceiling-mounted radiating elements (1, 1') to be connected together. The radiating surfaces (1.n, 1n+1) are arranged in an X-shape around the through-flow pipe (3), wherein here four radiating surfaces are provided. In this variant, two mounting rails (4) arranged vertically opposite one another are provided for positioning the connecting parts (5), and lock and secure the ceiling-mounted radiating elements (1, 1') when the connection is produced. The core piece (2) has ring and/or collar and/or stop-centering elements (2.1) arranged in the middle on both sides. Furthermore, seals (2.2, 2.2') are arranged which guarantee adequate tightness. The mounting rails (4) and the connecting pieces (5) have mechanisms (4.1) in active co-operation which guarantee security against slipping and twisting of the ceiling-mounted radiating profiles (1, 1'). Alternatively, it is also possible that the mounting rails (4) can be used as connecting elements for ceiling fixing and/or for mounting additional attachments (lamps). The mounting rails (4) for positioning the connecting parts (5) are here arranged directly radially offset around the circumference of the through-flow pipe (3).

Figure 2:
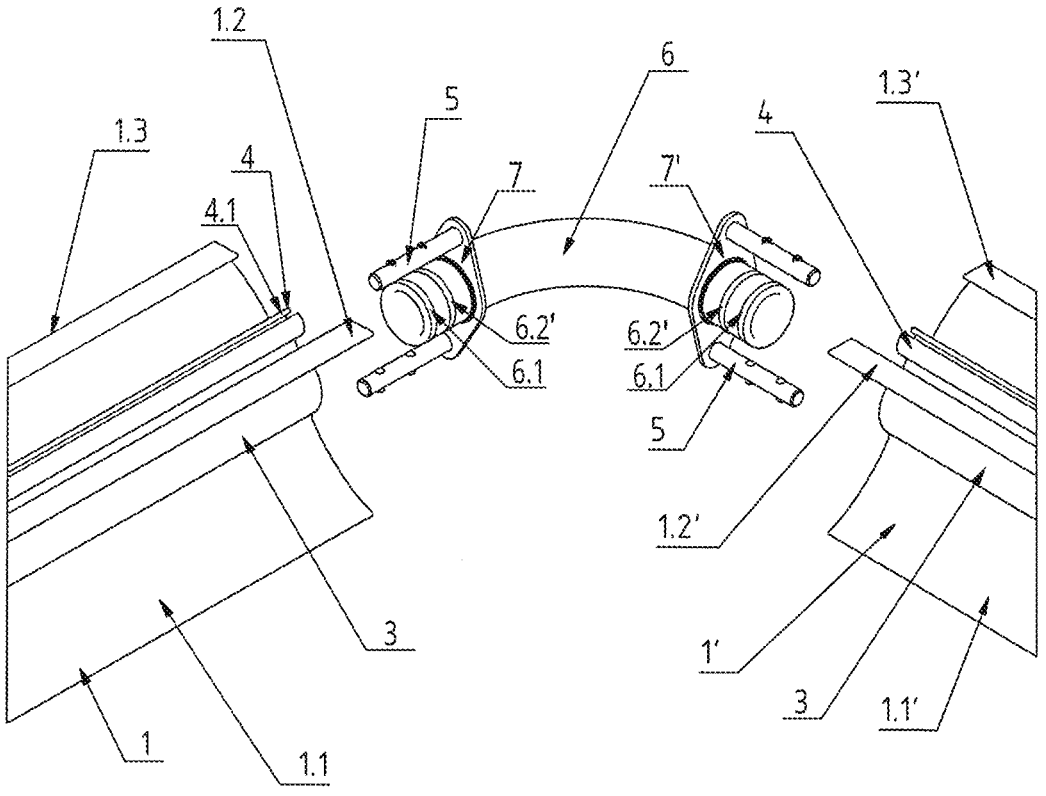
FIG. 2 shows a perspective view of two ceiling-mounted radiating elements to be connected together with a corner transition piece.

FIG. 2 shows how two ceiling-mounted radiating elements (1, 1') are connected together via a corner transition piece (6), wherein the corner transition piece (6) has at least one seal (6.1, 6.2') on both sides, which guarantees adequate tightness, and pipe clamps (7, 7') are provided on both sides of the corner transition piece (6), at which connecting parts (5) are arranged which are suitable for guidance in the mounting rails (4) of the ceiling-mounted radiating elements (1, 1') to be connected together at a corner.

Figure 3:
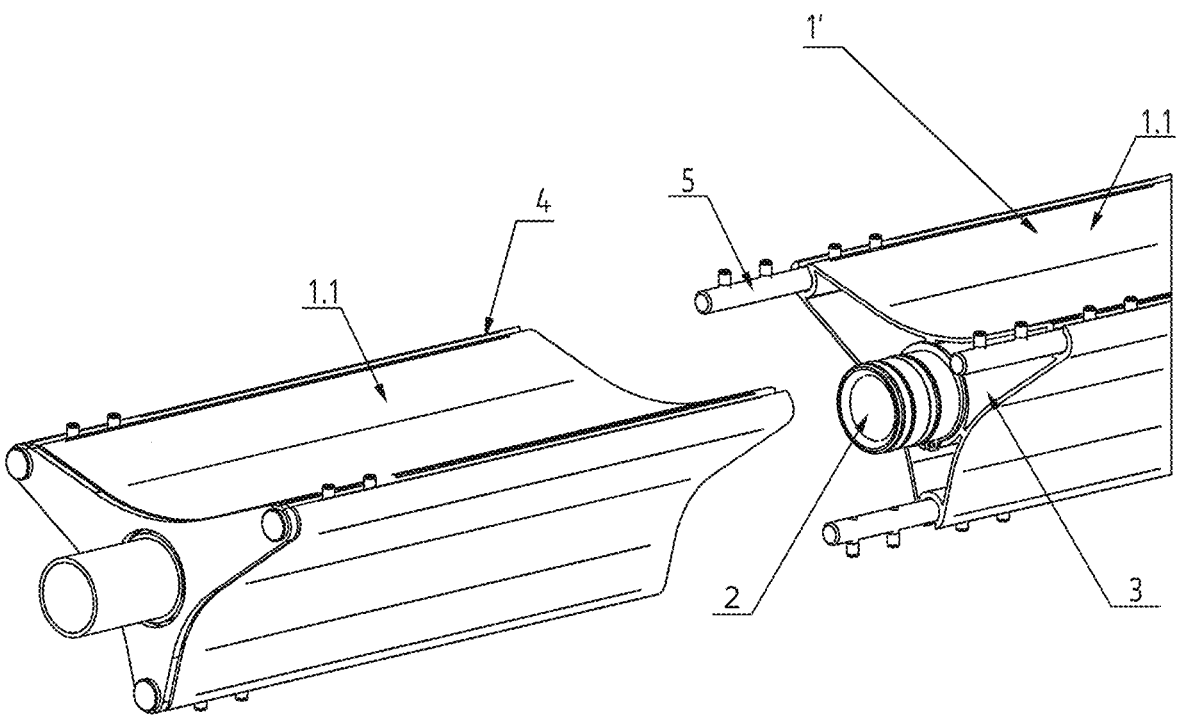
FIG. 3 shows a perspective view of two ceiling-mounted radiating elements to be connected together in another embodiment.
Figure 4:
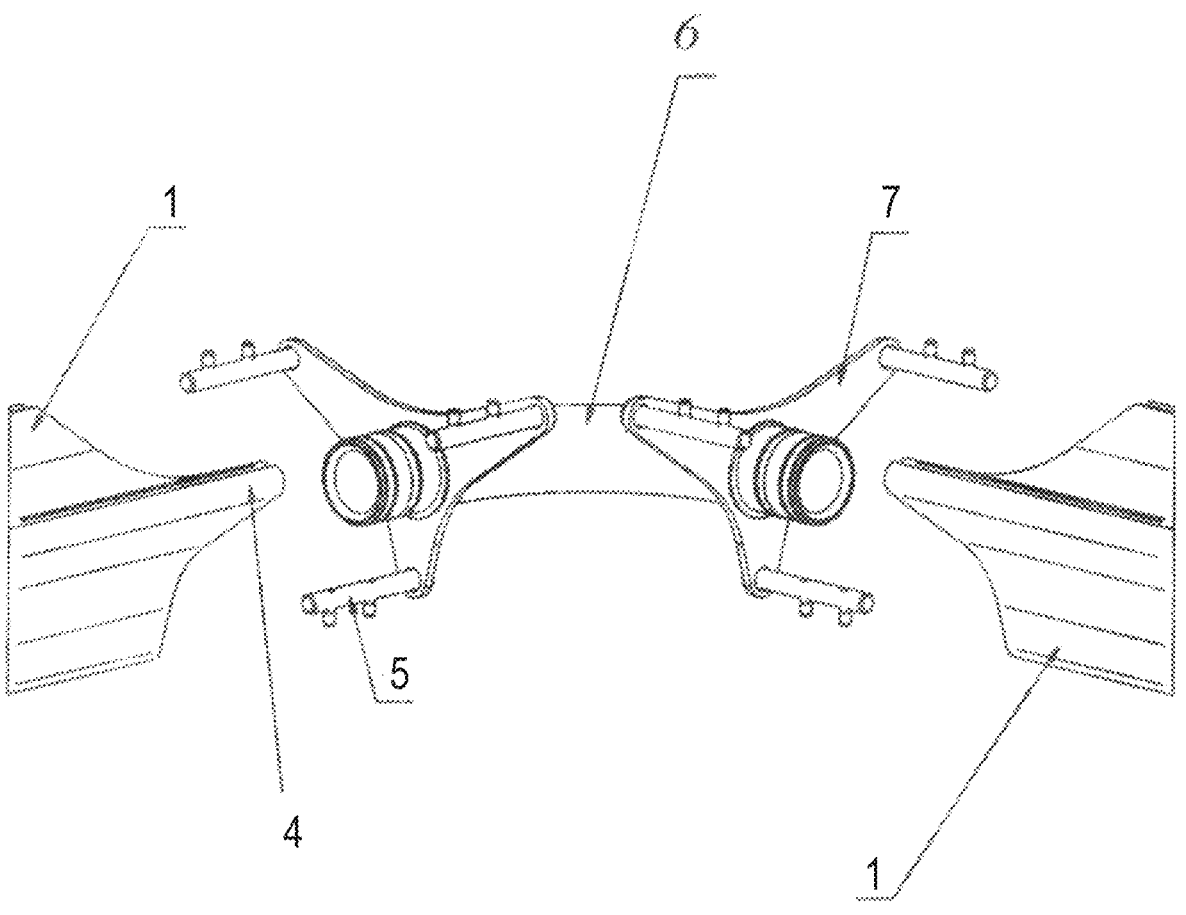
FIG. 4 shows a perspective view of two ceiling-mounted radiating elements to be connected together according to FIG. 3 with a corner transition piece.
Figure 5:
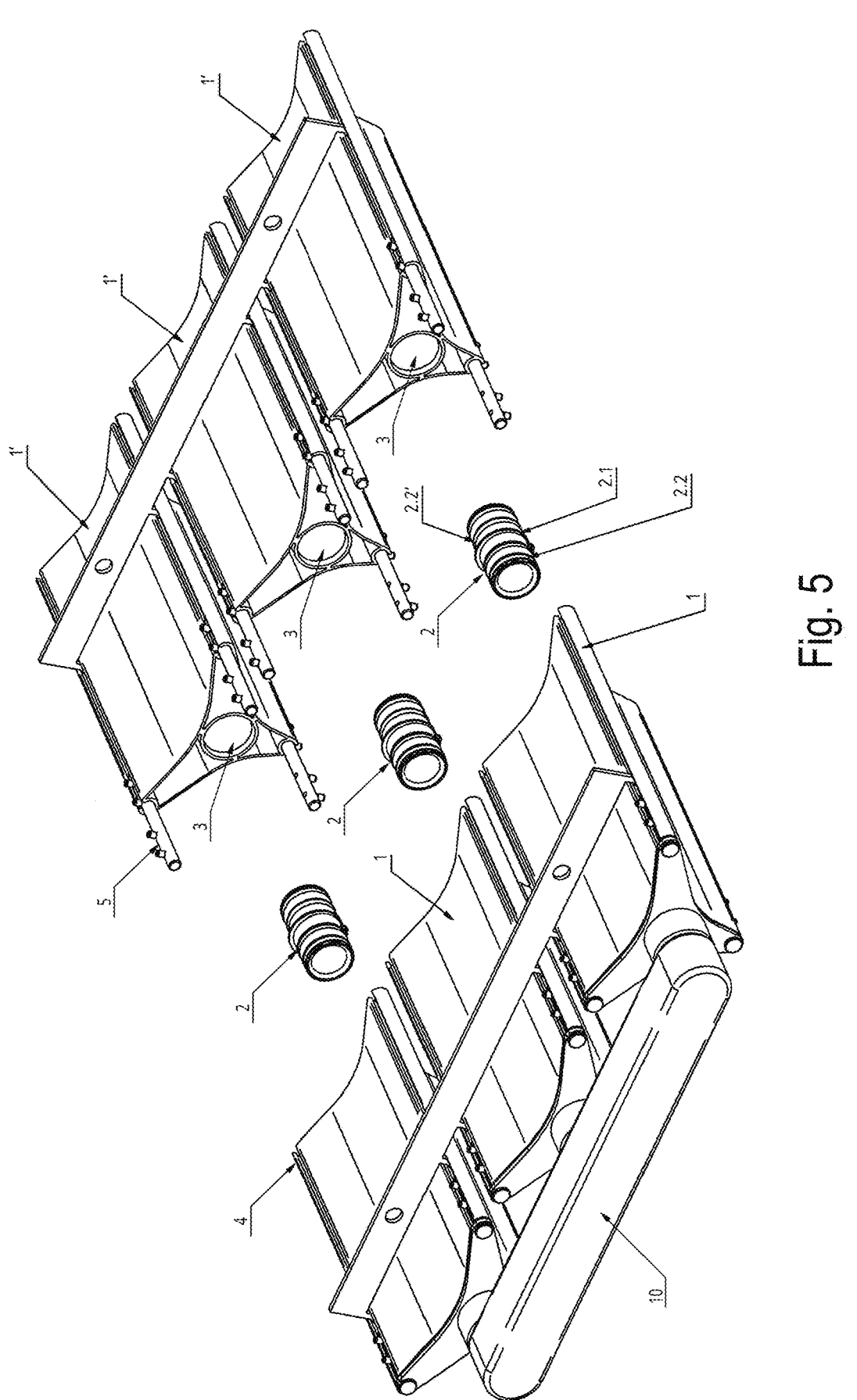
FIG. 5 shows an exemplary illustration of a cascade circuit of ceiling-mounted radiating elements with a collector.

The arrangement of the radiating surfaces (1.n, 1.n+1) around the through-flow pipe (3) is possible in all conceivable variants, wherein at least two radiating surfaces are positioned symmetrically or asymmetrically around the through-flow pipe (3). Further variants of the arrangement and formation of the radiating surfaces are shown in FIGS. 3 to 5. As well as an X-shaped arrangement, Y-shaped or star-shaped arrangements of the radiating surfaces around a through-flow pipe are possible, as is the arrangement of flat radiating surfaces (ceiling-mounted panel). The through-flow pipe 3 may also have cross-sectional forms other than circular.

In the variants shown in FIGS. 3 and 4, the mounting rails (4) for positioning of the connecting parts (5) are arranged at the free ends of the radiating surfaces (1.n, 1n+1).

The ceiling-mounted radiating profiles or elements (1,1') can be fluidically connected in series one behind the other and/or around corners or in parallel via a collector (10). A cascade circuit of several ceiling radiating elements is shown in FIG. 5. Here the profiles are connected via a collector 10.

What is claimed is:

1. A plurality of ceiling-mounted radiating elements for heating or cooling rooms, comprising means for connecting the ceiling-mounted radiating elements together, wherein each of the ceiling-mounted radiating elements comprises at least one through-flow pipe for a heating or cooling medium, and at least one radiating surface, means for connecting a first one of the plurality of ceiling-mounted radiating elements with a second one of the plurality of ceiling-mounted radiating elements comprising:

at least one core piece having an operationally tight connection to the through-flow pipes of the first and the second ceiling-mounted radiating elements, at least one connecting part and at least one mounting rail for positioning the at least one connecting part, wherein the at least one connecting part and the at least one mounting rail lock and secure the first and the second ceiling-mounted radiating elements together.

2. The ceiling-mounted radiating elements as claimed in claim 1, wherein the at least one mounting rail and the at least one connecting part have mechanisms in active co-operation.

3. The ceiling-mounted radiating elements as claimed in claim 1, wherein the at least one mounting rail comprises a connecting element for a ceiling fixing and/or for mounting of additional attachments.

4. The ceiling-mounted radiating elements as claimed in claim 1, wherein two ceiling-mounted radiating elements are connected together via a corner transition piece, wherein the corner transition piece has at least one seal on both sides, and wherein pipe clamps are provided on both sides of the corner transition piece, at which the at least one connecting part is arranged in the at least one mounting rail of one of the plurality of the ceiling-mounted radiating elements.

5. The ceiling-mounted radiating elements as claimed in claim 1, wherein several radiating surfaces are arranged radially around said through-flow pipe, wherein at least two radiating surfaces are positioned symmetrically or asymmetrically around the through-flow pipe.

6. The ceiling-mounted radiating elements as claimed in claim 1, wherein more than one mounting rail for positioning of more than one connecting part are arranged directly radially offset around the circumference of the through-flow pipe.

7. The ceiling-mounted radiating elements as claimed in claim 1, wherein the radiating surfaces each have a free end, and wherein at least one mounting rail for positioning of at least one connecting part is arranged at the free ends of the radiating surfaces.

8. The ceiling-mounted radiating elements as claimed in claim 1, wherein the ceiling-mounted radiating elements are fluidically connected in series one behind the other and/or around corners or in parallel via a collector.

9. The ceiling-mounted radiating elements as claimed in claim 1, wherein the core piece has at least one seal and a ring and/or collar and/or stop-centering element arranged in the middle of a first and a second seal of the at least one seal.

10. The ceiling-mounted radiating elements as claimed in claim 9, wherein the ceiling-mounted radiating elements are fluidically connected in series one behind the other and/or around corners or in parallel via a collector.

11. The ceiling-mounted radiating elements as claimed in claim 9, wherein the at least one mounting rail and the at least one connecting part have mechanisms in active co-operation.

12. The ceiling-mounted radiating elements as claimed in claim 11, wherein the ceiling-mounted radiating elements are fluidically connected in series one behind the other and/or around corners or in parallel via a collector.

13. The ceiling-mounted radiating elements as claimed in claim 11, wherein the at least one mounting rail comprises a connecting element for a ceiling fixing and/or for mounting of additional attachments.

14. The ceiling-mounted radiating elements as claimed in claim 13, wherein the ceiling-mounted radiating elements are fluidically connected in series one behind the other and/or around corners or in parallel via a collector.

15. The ceiling-mounted radiating elements as claimed in claim 13, wherein two ceiling-mounted radiating elements are connected together via a corner transition piece, wherein the corner transition piece has at least one seal on both sides, and wherein pipe clamps are provided on both sides of the corner transition piece, at which the at least one connecting part is arranged in the at least one mounting rail of one of the plurality of the ceiling-mounted radiating elements.

16. The ceiling-mounted radiating elements as claimed in claim 15, wherein the ceiling-mounted radiating elements are fluidically connected in series one behind the other and/or around corners or in parallel via a collector.

17. The ceiling-mounted radiating elements as claimed in claim 15, wherein several radiating surfaces are arranged radially around said through-flow pipe, wherein at least two radiating surfaces are positioned symmetrically or asymmetrically around the through-flow pipe.

18. The ceiling-mounted radiating elements as claimed in claim 17, wherein more than one mounting rail for positioning of more than one connecting part are arranged directly radially offset around the circumference of the through-flow pipe.

19. The ceiling-mounted radiating elements as claimed in claim 18, wherein the radiating surfaces each have a free end, and wherein at least one mounting rail for positioning of at least one connecting part is arranged at the free ends of the radiating surfaces.

20. The ceiling-mounted radiating elements as claimed in claim 19, wherein the ceiling-mounted radiating elements are fluidically connected in series one behind the other and/or around corners or in parallel via a collector.

* * * * *